United States Patent Office 2,749,304
Patented June 5, 1956

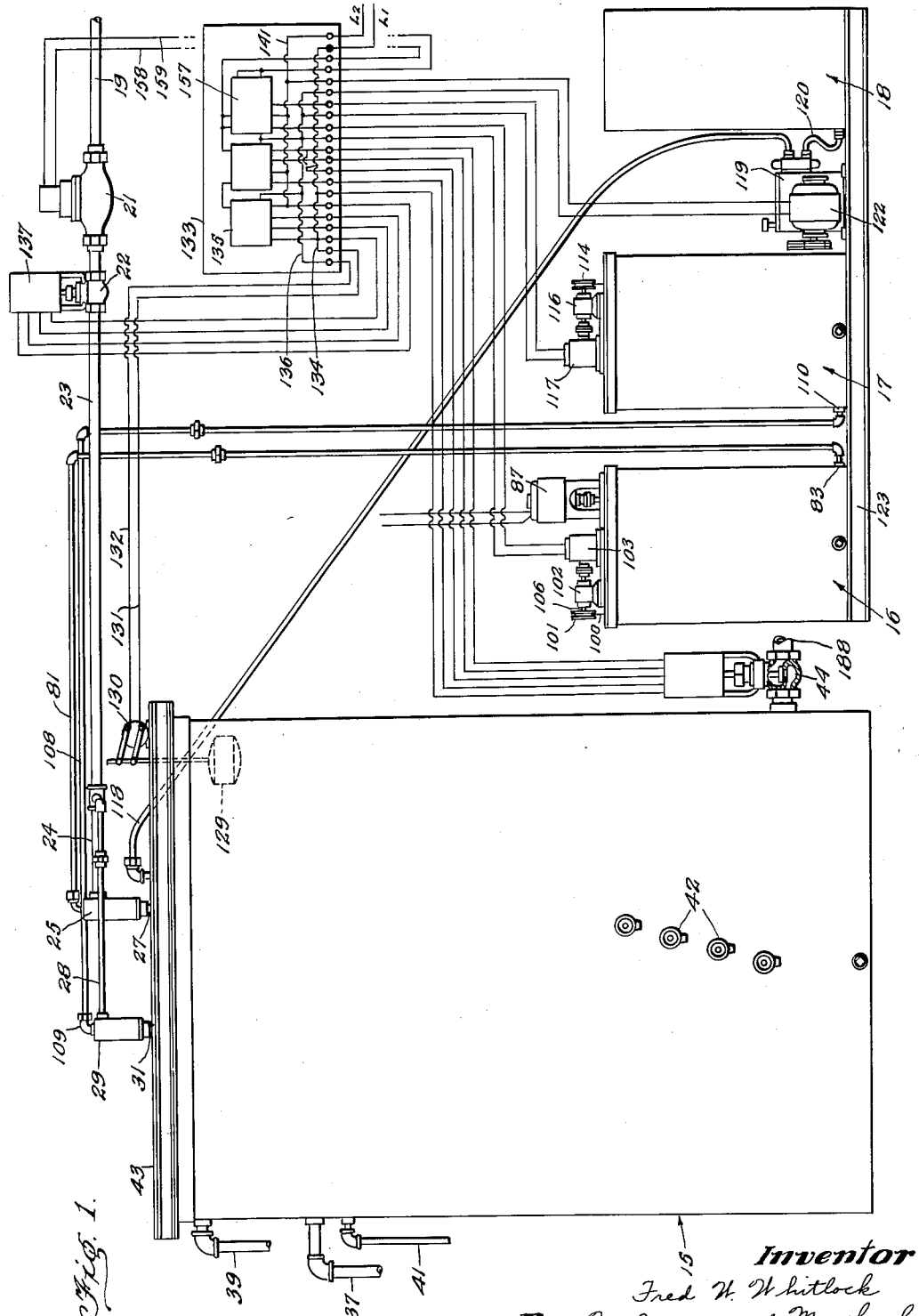

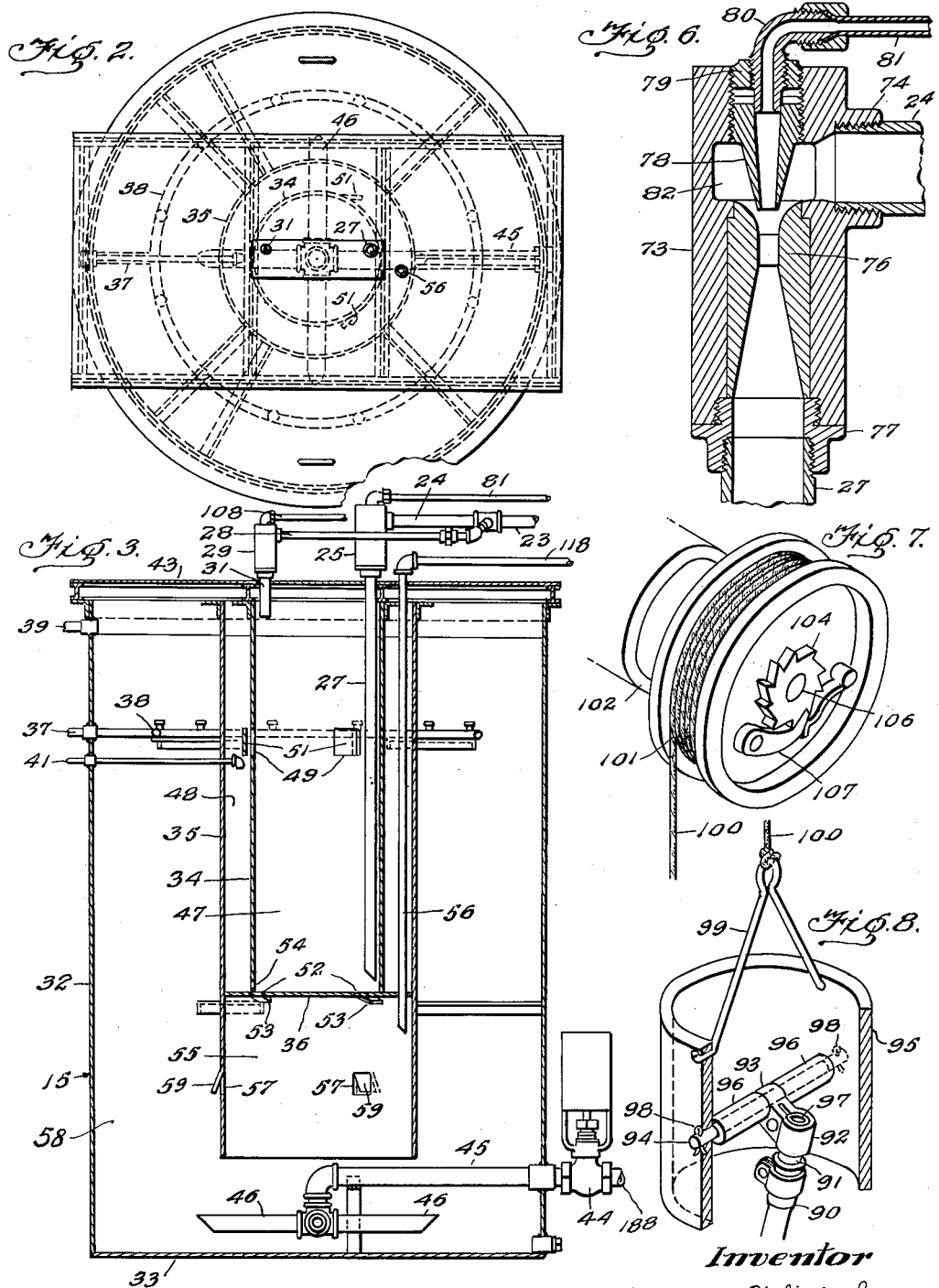

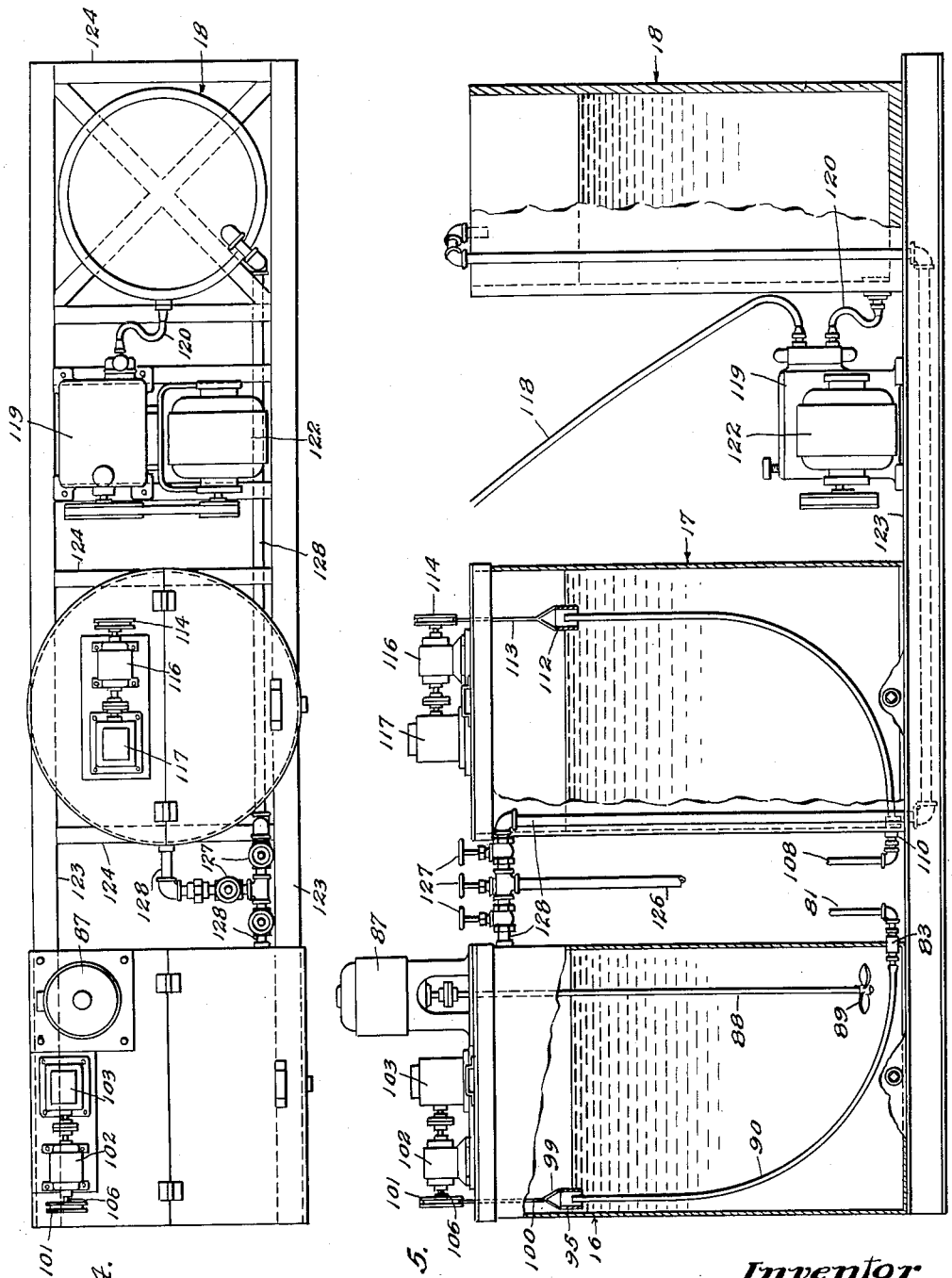

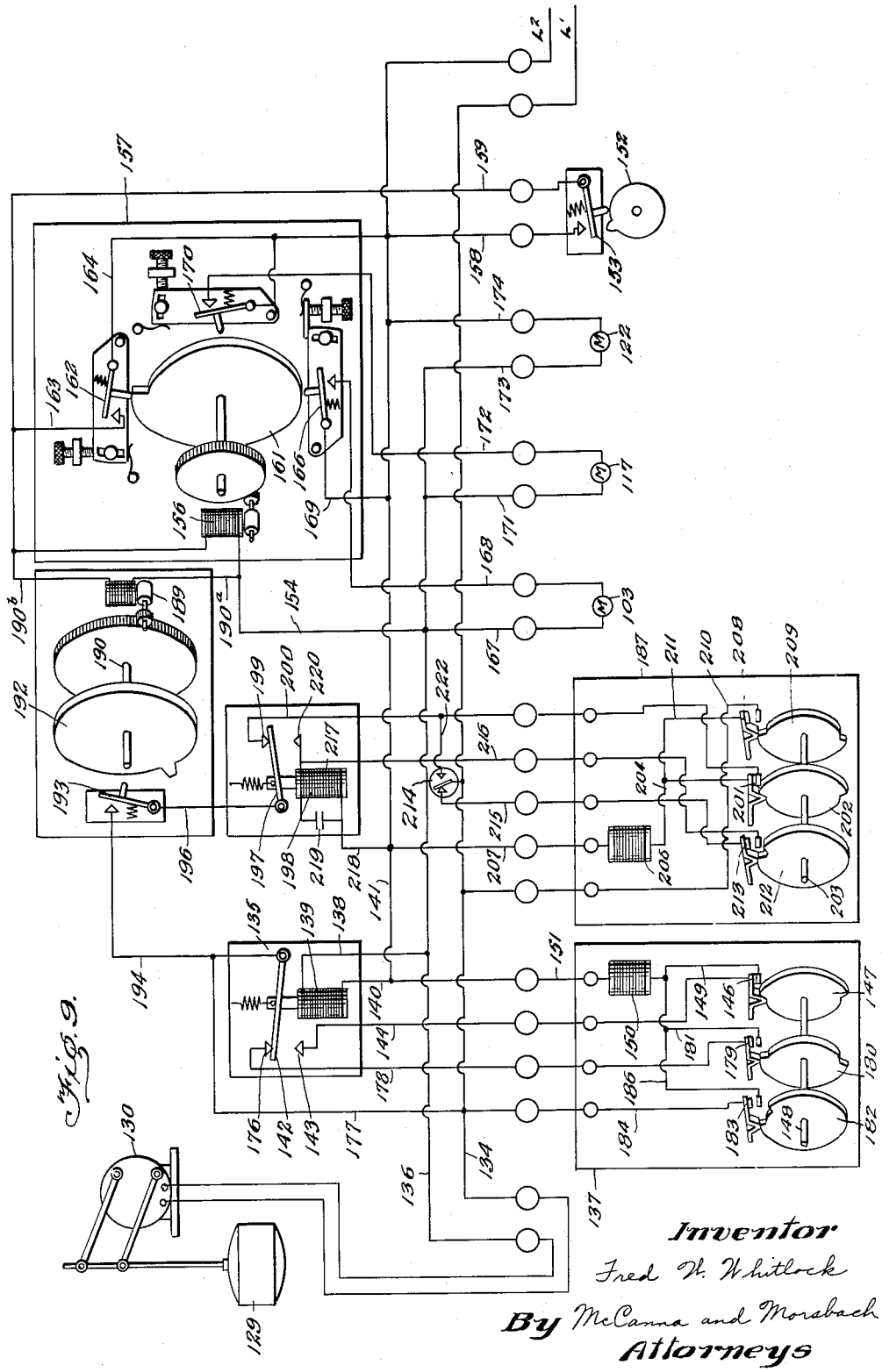

2,749,304

WATER TREATMENT APPARATUS OF THE LIME SODA TYPE

Fred W. Whitlock, Rockford, Ill., assignor to Aquamatic Inc., a corporation of Illinois Application November 30, 1950, Serial No. 198,334

15 Claims. (Cl. 210—22)

This invention relates to water treatment apparatus of the so-called lime soda type in which water is treated by means of chemical reagents to improve its characteristics.

An important object of the invention is the provision of water treating apparatus having improved means for incorporating the reagents into the water being treated.

Another important object is the provision of water treatment apparatus having improved control means for controlling the addition of reagents and the removal of sludge.

A still further object of the invention is the provision of an improved apparatus for controlling the cycles of operation of a water treatment apparatus.

Another object is the provision of a water treatment apparatus having improved means for feeding chemicals to a water treatment apparatus.

Further objects will be apparent from the following specification, appended claims, and the drawings thereof, in which—

Figure 1 is an elevation of a plant constructed in accordance with this invention;

Fig. 2 is a plan view of the reaction tank;

Fig. 3 is a vertical sectional view thereof;

Fig. 4 is a plan view of the dosing chemicals tanks;

Fig. 5 is a vertical sectional view thereof;

Fig. 6 is a vertical sectional view through an ejector as used in the system;

Fig. 7 is a perspective of cable reel for the drop-pipe;

Fig. 8 is a perspective view, partly in section of, the drop-pipe suction intake, and Fig. 9 is a wiring diagram.

The invention is herein shown embodied in a plant for treatment of water by means of lime or lime and soda ash, a coagulant and a sterilizing agent though it will be understood that the specific treatment may be varied widely within the scope of the invention. In this instance the unit embodies a reaction tank 15 of more or less conventional construction, a lime slurry tank 16, a coagulant tank 17 and a sterilizing reagent tank 18, material from the latter three tanks being fed to the reagent tank for water treatment purposes.

Water to be treated, hereinafter referred to as raw water though the water may have previously had other treatment, enters the system through supply pipe 19, passes through a volume meter 21, a motor operated valve 22 and a pipe 23 to a point adjacent the top of the reaction tank, where the supply is divided, part flowing through a pipe 24, ejector 25 and depending pipe 27 and a part flowing through pipe 28, ejector 29 and depending pipe 31.

The reaction tank 15, which may be of conventional design in this instance comprises the tank proper formed by outer wall 32 and bottom 33, within which are supported concentric cylindrical walls 34 and 35 and a cross partition 36 closing the bottom of the chamber defined by walls 34. The pipe 27 admits water adjacent the bottom of the reaction chamber formed by the walls 34 which passes up through this chamber thence downward through the coagulating chamber between walls 34 and 35, through the stilling chamber beneath cross wall 36 and then into the outer storage chamber between the walls 35 and 32. Treated water flows to a service pipe 37 from a collector ring 38 located in the storage chamber adjacent the top of the tank. The tank may have the usual overflow pipe 39, and valved sampling pipes 41 and 42. The tank may also have the usual cover 43. Sludge is removed from the bottom of the tank through a motor operated valve 44 connected by a pipe 45 to collector 46 in the form of cross pipes arranged to provide a suitable rate of flow.

The reaction tank thus comprises a plurality of chambers providing a series of stages in processing the water. In the center of the reaction tank within the inner wall 34 and the bottom 36 is the mixing compartment 47. The raw water from the delivery pipe 27 enters this compartment near the bottom and as this raw water passes through the injector 25, lime slurry and air are picked up, as will presently be described, and the mechanical mixture is discharged at the bottom of this compartment creating a turbulent condition for thorough mixing, the liberated air bubbles rising through the mixture to provide thorough agitation throughout the mixing chamber. The short delivery pipe 31 discharges its apportioned flow of make-up water to the upper end of this mixing chamber, the required proportion of coagulant being picked up in the ejector 29 and delivered to the mixing compartment above the normal water levels therein. The air introduced through the ejector provides a thorough mixing of the contents of the chamber and eliminates the need for mechanical stirring devices heretofore common in the art and a cause for frequent shut-downs for cleaning.

A flocculating compartment 48 is formed in the area between the inner wall 34 and intermediate wall 35. Liquid from the primary mixing compartment passes through openings 49 formed in the inner wall 34 slightly above the center of the compartment. Baffles 51 just outside the openings 49 cause the discharged liquids to be deflected toward the right when looking down upon the tank so that the mixture is given a more thorough mixing in the flocculating compartment by causing the liquid to travel in a clockwise direction helically around and downwardly in this flocculation compartment. The bottom 36 has a plurality of openings 52 between the inner wall 34 and the intermediate wall 35 so that the flocculated liquids from this compartment may pass on to the next stage of treatment. These openings 52 have baffles 53 to deflect the discharged liquid in a clockwise rotation when viewed from above. A small weep hole 54 is provided in the wall 34 near the bottom so that when it is desired to drain the tank, the contents of the primary mixing chamber 47 may drain off.

Below the bottom 36 and within the skirt of the intermediate wall 35, is a stilling compartment 55 where the velocity of the liquid is greatly reduced. Here the liquid is mixed with a sterilizing agent such as chlorine solution, or other agents adapted to liberate chlorine or the like delivered through a pipe 56 which may suitably extend downwardly from the top of the tank. In this chamber most of the floc settles from the liquid and passes down to the bottom of the tank. A plurality of openings 57 formed in the skirt of the wall 35 permit the water to pass outwardly into the storage chamber 58, baffles 59 deflecting the liquids passing through these openings downwardly. The lime slurry and the coagulant are supplied to the reaction tank premixed with the incoming raw water by means of the ejectors 25 and 29, the energy of the water under pressure thus being used to effect these feeding operations.

The ejector 25 in pipe 24 is shown in Fig. 6 and comprises a body 73 having a flange 74 thereon to receive the end of the pipe 24. A venturi tube 76 is mounted in a bore formed in the body and a bushing 77 having threaded engagement with this body carries the upper end of the delivery pipe 27. A threaded opening in the upper end of the body adjustably supports a nozzle 78 which may be moved closer to or farther away from the converging cone of the venturi tube. After proper adjustment of the nozzle, a plug 79 is inserted in this threaded opening, into which a pipe fitting 80 is screwed, to receive a lime slurry pipe 81. The raw water from pipe 24 enters the cavity 82 in the ejector body and passes through the area between the converging cone of the venturi and the nozzle at a high velocity, drawing air and lime slurry in through the nozzle 78.

It will be seen that the incoming water under relatively high pressure is being discharged through the throat of the venturi in the form of a cylinder of water at high velocity and that the incoming lime (or lime and soda) is drawn into the center of this cylinder so that the lime or other reagent does not contact the walls of the venturi and no deposit forms on the inside of the ejector.

The lime slurry pipe 81 leads to a fitting 83 welded in the side wall of a slurry tank 16 (see Fig. 5). A stirring device is provided for agitating the lime slurry and comprises a vertically mounted motor 87 having a depending shaft 88 which carries a conventional propeller 89. Current for this motor is supplied through a manually controlled circuit independent of the electrical controls hereafter described.

A flexible tube 90 is attached at one end to the fitting 83 so that the open end may be raised or lowered without resistance. The end of this tube 90 is attached to a nipple 91 (Fig. 8) carried by a swinging bracket 92 which has an extension 93 formed thereon. This extension is drilled to receive a pin 94 the ends of which pass through the side walls of a relatively heavy piece of metal tubing 95, spacing sleeves 96 being interposed between the walls of the tube and the bracket 92 to center the latter, the extension being free to rotate on the pin. The pin 94 has its ends drilled to receive cotter pins 98 to hold it in place. The tube 95 provides a stilling area in the tank in the area where the suction intake 97 operates necessitated by the fact that the slurry must be violently agitated to maintain the lime in suspension.

The tube 95 has a bail 99 secured therein for support by a chain or cable 100, the cable being played out from a reel such as shown in Fig. 7, to lower the drop pipe comprising the suction intake 97 and its associated parts.

The cable 100 is played out from a reel 101 as shown in Figs. 1, 4, 5, and 7, supported on the shaft 106 of a conventional speed reducing unit 102 operated by an electric motor 103. The shaft 106 rotates in only one direction at a very slow rate and a quick return for rewinding the cable 100 on the reel 101 is provided, having a ratchet wheel 104 secured to the shaft 106, and a spring pressed dog 107, carried by the reel to engage this ratchet wheel. Prior to refilling the tank 16 with a new batch of lime slurry, the cable 100 can be rewound on the reel 101 by manually turning the reel in the reverse direction. The weight of the drop pipe causes the cable 101 to unwind as the shaft 106 is rotated. The electrical control which governs the operation of motor 103 is hereafter described.

Ejector 29 for feeding the coagulant may be substantially identical with ejector 25 or may be the more conventional form in which the pressure liquid passes through the nozzle and needs no further description. This ejector has a coagulant suction pipe 108 connected to a fitting 109 which leads to the nozzle in the ejector body and connects to a fitting 110 in the wall of coagulant tank 17, which also has a drop pipe 112 suspended therein. The detailed construction of drop pipe 112 is similar to that of the drop pipe for the lime slurry tank. Drop pipe 112 is supported by a cable 113 wound on a reel 114 which is supported by the output shaft of a speed reducer 116 driven by an electric motor 117. As the motor 117 rotates, the speed reducer 116 imparts a slow movement to the reel 114 which plays out the cable so that the drop pipe 112 is lowered slowly. As its suction intake moves below the level of the liquid in the tank, liquid spills over into the suction intake and is drawn along with the air up through the suction pipe 108 by the injector 29 and discharged into the reaction tank.

Pipe 56 for feeding chlorine to the reaction tank is connected to a tube 118 leading to a chemical feed pump 119 (Fig. 5) of conventional construction having means for adjusting the mechanism to provide the correct amount of chemical to meet the demands of the raw water being treated. This pump has its intake connected to a flexible tube 120 leading to the reagent tank 18 and having a conventional foot valve at its free end. Pump 119 is driven by an electric motor 122 for which the controlling circuit will be hereafter described.

As shown in Figs. 1, 3, and 4, the tanks 16, 17, and 18 may be mounted upon a base comprising channels 123 and cross members 124. This provides a single compact unit and makes it easy to arrange the dosing tanks with respect to the reaction tank and simplifies the water piping arrangement for recharging. Water may be supplied through a connection 126, and valves 127 to branch pipes 128 leading to the several tanks so that an attendant may refill these tanks without spilling water.

Automatic controls are provided such that the system requires but a minimum of personal supervision and care for satisfactory results. A float 129 (see Figs. 1 and 9) is located in the reaction tank and as shown in Figure 1, this float closes the electric switch indicated at 130 when the water level falls to a lower level, and opens the switch when the water level rises to an upper level to open and close the raw water supply valve 22. Wires 131 and 132 lead from switch 130 to terminals on a panel 133, wire 131 connecting to a bus-bar 134 in turn connected to L1 of the power supply and wire 132 connecting to a bus-bar 136 to provide a controlled circuit for several of the parts.

The numeral 137 indicates the motor driving and switching mechanism for the inlet valve 22 which is a well known type of motor driven valve. When bus-bar 136 becomes energized by closing of switch 130 as the water in the reaction tank reaches its lower level, a circuit is established through switch 139, bus-bar 136, a wire 123 to the winding 139 of a relay 135, and through a wire 140 to a bus-bar 141 which is connected to L2 of the power source. This moves contactor 142 of the relay to engage contact 143 and close a circuit through wire 144 to contact 146 in the motor mechanism. Contacts 146 are opened and closed by a cam 147 on the drive shaft 148 of the motor mechanism and when these contacts are closed, the circuit is completed through the wire 149 to the winding 150 of this motor mechanism. The motor 150 is geared to operate the valve 22 through the shaft 148 which in turn operates to open and close the valve upon rotation through 180° steps. From the winding 150, a wire 151 completes the circuit to bus-bar 141, back to the power supply. The motor operates until cam 147 moves through 180° of its travel, at which time contacts 146 are opened and the motor stops with the valve 22 in the open position, and raw water flowing into the reaction tank.

The meter 21 located in the raw water supply pipe carries a cam 152 (Fig. 9) which is driven from the gear train of the meter to engage the plunger on a switch 153 upon the passage of a predetermined volume of water to energize the motor 156 of a one revolution controller 157 arranged to control the duration of the interval through which lime slurry and coagulant are supplied to the reaction tank, the rate of supply being constant as determined by the rate at which the swing pipes are lowered.

When the switch 153 is closed a circuit is momentarily established from bus-bar 141 through switch 153, conductors 159 and 158 to the motor 156 thence through conductor 154 to bus-bar 136. The motor of controller 157 is geared to drive an Archimedean cam 161 through one revolution in approximately fifty seconds so that within a matter of seconds after the motor is energized the plunger of a normally open switch 162 drops off the cam allowing the switch to close and completing a holding circuit to motor 156 by way of a short circuit including conductors 163 and 164 to maintain operation of the controller motor through a complete cycle in spite of the subsequent opening of switch 153. The motor stops when the cam 161 depresses the plunger of switch 162 to open its contacts.

As cam 161 is rotated, the lobe engages the plunger on a switch 166 and closes a circuit from bus-bar 136 through lead wire 167 to the lime slurry drop pipe motor 103, return wire 168 through the closed contact in switch 166 and through the return wire 169 back to the bus-bar 141 to complete the circuit.

In like manner, as the cam 161 advances further in its rotation, the lobe of this cam engages the plunger on a switch 170 closing the contacts in this switch to complete a circuit from bus-bar 136 through lead 171 to the coagulant drop pipe motor 117, return wire 172 to the closed contacts in switch 170 and through the return wire 164 back to bus-bar 141 to complete this circuit.

It is not intended that motor 103 for the lime slurry drop pipe and motor 117 for the coagulant drop pipe should operate as long as motor 156 operates during each cycle so cam 161 is laid out as an Archimedean cam and switches 162, 166 and 170 are mounted for adjustment with respect to the cam 161 to adjust the interval during which the motors 103 and 117 operate and consequently the duration of the feed interval. For example it may be that a duration of from ten to fifteen seconds is required to feed sufficient slurry to treat the amount of water for which the cam 152 is set, in which case the body of switch 166 should be adjusted by means of the adjusting screws shown to be actuated by the cam 161 for about one-fourth of its rotation. In like manner the body of switch 170 may be adjusted to energize the motor 117 for the necessary interval. The switch body 162 should be adjusted so that the cam holds the contacts closed to within a few degrees of the end of the lobe before the contact points are opened.

The chlorine feeder motor 122 is energized as long as the float switch 130 contacts are closed and throughout the period when raw water is flowing to the reaction tank, its circuit including a lead 173 from bus-bar 136 to motor 122 and a return lead 174 from the motor to bus-bar 141.

As raw water is admitted to the reaction tank, the float 129 rises and when the water reaches the upper level the circuit through the float switch 130 is opened, de-energizing bus-bar 136 and relay coil 139 and allowing contactor 142 to move under spring pressure to engage contact 176 in relay 135. This establishes a circuit from bus-bar 134, through lead wire 177 to contactor 142, and from contact 176 through lead wire 178 to contacts 179 of the valve motor mechanism 137 now closed since cam 180 now occupies a position 180° from that shown in Fig. 9. The circuit from wire 178 continues through contacts 179, lead wire 181 to the winding 150 and thence through conductor 151 to bus-bar 141 to operate the motor and close valve 22. To assure a full rotation of the motor shaft 148 through the opening and closing cycle of the supply valve, a third cam 182 is provided on motor shaft 148. This cam is provided with a lobe which closes contacts 183 a short interval before cam 180 opens contacts 179. Through a circuit including lead 184 from bus-bar 134, to contacts 183 and lead 186, the winding 150 is held in an energized state until cam 182 allows contacts 183 to open. This insures the return of the cams to the starting position and the valve to closed position.

The sludge draw-off from the reaction tank is accomplished by the valve 44 to which a waste pipe 188 is connected, the valve being driven by a motor drive unit indicated at 187 and similar to the unit 137. To control the frequencies of operation of this motor operated valve an integrating device is employed including a timing motor 189 which, through a train of gearing drives a cam shaft 190 carrying a cam 192, at a rate to complete one revolution in eight hours, if run continuously. The timing motor 189 does not however normally run continuously, but in intervals controlled by the number of gallons of raw water delivered to the reaction tank. When the meter switch 153 delivers a pulse to motor 156, this pulse also energizes the motor 189 through leads 190a and 190b and when the holding circuit is established through switch 162, this holding circuit also energizes the motor 189 to rotate cam 192. When the lobe of cam 192 engages the plunger of a switch 193 and closes the contacts therein, a circuit is established from bus-bar 134 through lead 177, a lead 194, the contacts of switch 193, lead 196, a contactor 197 in a relay 198, through contact 199, and lead 200 to contacts 201 in the motor driven unit 187. These contacts are operated by a cam 202 on the shaft 203 driven from motor 206, the shaft also acting to operate the valve between open and closed position. When cam 202 permits contacts 201 to close, the circuit is continued through lead 204 to the motor 206 and a return wire 207 connected to bus-bar 141.

Contacts 201 are closed in the normal closed position of the valve and when the circuit thereto is closed at switch 193 as previously described the motor 206 runs until the shaft 203 has been rotated through approximately 180° at which point the lobe on cam 202 opens contacts 201. However, before contacts 201 are opened by cam 202, contacts 208, actuated by cam 209 close and continue the motor operation to complete substantially 360° of continuous rotation. The valve 44 starts to open as soon as shaft 203 starts its rotation and progressively moves toward its fully open position through 180° of rotation of the shaft. With continued rotation of the shaft the valve starts toward its closed position and goes closed with a continuous movement. Contacts 208 close a circuit through lead 210 from bus-bar 134 to the contacts and then through lead 211 to motor 206 to complete the circuit. Shortly before the drive shaft 203 has completed its 360° of rotation, a cam 212 on shaft 203 closes contacts 213 for a short period of time, and when these contacts are closed, they establish a circuit from bus-bar 134 through one contact in a single pole, double throw switch 214, connected to bus-bar 134 and a lead 215 to the contact 213. From these contacts a lead 216 connects to winding 217 of relay 198 to energize this winding and a return wire 218 completes this circuit to bus-bar 141. A condenser 219 is bridged across the terminals of winding 217. When winding 217 becomes energized, contactor 197 is moved to engage a contact 220 to set up a holding circuit through winding 217 to prevent motor 206 from starting a second cycle of operation until cam 192 functioned to open the contacts of switch 193.

The single pole double throw switch 214 has its other contact in a circuit through a wire 222 to wire 200 so that when an additional operation of the sludge draw-off valve is desired, the manually operated switch may be moved momentarily to complete a circuit from bus-bar 134 to motor 206 for another cycle of operations in opening and closing the sludge draw-off valve. If the switch 214 is left in the latter position the valve 44 will be moved to open position and remain thereat to drain the tank.

*Operation*

As treated water is drawn off through service pipe 37, the water level in the tank drops until the float 129 closes switch 130 energizing the circuit to valve motor 150 and opening the raw water valve 22 to admit water to the reaction tank through ejectors 25 and 29. As the water flows to the tank air or air and reagent is continuously drawn into the stream of water through the tubes 90 and 112. This valve remains open until enough raw water has been admitted to the tank to open float switch 130. Meanwhile, the winding 139 of relay 135 remains energized. As raw water flows through meter 21, the meter provides a tripping pulse for preselected number of gallons of raw water passing through it which pulse is created by the switch 153 upon engagement by the cam 152 in the meter mechanism. Each pulse initiates a single cycle of motor 156 which continues until cam 161 has rotated enough to again open the contacts in switch 162. This will require approximately fifty seconds or just a few seconds less time than the interval of time between the initiation of the impulses by switch 153. At maximum pressure, this will be about sixty seconds, and at lower pressures, the interval of time may be greater. This provides a short interval between the completion of the cam rotation and the initiation of a following pulse to start another cycle of operation of the dosing control motor 156.

While cam 161 is being rotated, switches 166 and 170 will be operated and when the contacts of switch 166 close, motor 103 for the lime slurry drop pipe is energized and this motor, through its speed reducer 102, slowly lowers the stilling tube 95 of the drop pipe so that as the suction intake 97 moves below the liquid level of the lime slurry in tank 16, lime slurry spills into the suction intake 97 and is carried by the incoming air to the nozzle 78 where it mixes with the incoming raw water and passes into the reaction tank 15.

The lime slurry entering the suction intake does not flow as a continuous stream or in volume sufficient to maintain a full flow through the suction pipe, but in small quantities which form slugs or droplets which move through the suction pipe at a high velocity so that there is no tendency to form lime deposits about the intake or anywhere along the line and dilution of the slurry occurs in the ejector where the mixture of water and slurry is traveling at high speed and in pipe 27, under extreme turbulence caused by the entrained air. If more lime slurry is needed in the reaction tank, it is provided in uniform doses of greater duration by adjusting switch 166 with respect to cam 161 to provide a longer operation of motor 103 and as the operation of these controlling units is dependent upon the inflow of water to the reaction tank, a thorough mixing of the lime slurry and water is accomplished in the ejector and in the primary mixing compartment 65.

In substantially the same manner, the coagulant from tank 17 is caused to spill into the suction intake of the coagulant drop pipe 112 as the motor 117 lowers the drop pipe in this tank, and by the suction action through suction pipe 108, the coagulant is drawn through ejector 29 and delivered into the primary compartment 47 of the reaction tank. To increase or decrease the amount of coagulant fed to the reaction tank, switch 170 is moved closer to or further away from cam 161 to lengthen or shorten the arc of contact with this cam as the case may be.

As each pulse from switch 153 energizes motor 156 the control motor 189 for the sludge draw-off is also energized and runs during the entire period of operation of motor 156 during which interval motor 189 rotates the cam 192 through a small angularity. The cam shaft 190 is geared to motor 189 to make one revolution in approximately four hundred and eighty minutes of continuous running by motor 189. This provides a calculated ratio between the number of gallons of water admitted to the reaction tank and the rate of sludge draw-off by the valve 44. As this control motor will run only at intervals determined by the pulses provided by meter cam 152 in response to the number of units of raw water admitted to the reaction tank, the position of cam 161 is a measure of the number of gallons of water treated since the previous sludge draw.

Step by step, the cam 192 advances and when the lobe of this cam closes switch 193, a circuit is closed to start motor 206 and drive valve 44 to open position. This valve operates through a continuous cycle of 360° through a continuous opening and closing movement as previously described. During the time the valve is opening and closing, sludge which has accumulated in the reaction tank flows out through the valve 44 and drain pipe 188 to a sewer or other suitable waste, by the hydrostatic head of the liquid in the reaction tank.

To prevent motor 187 from again opening and closing the sludge draw-off valve while switch 193 is closed for a single operation, switch 213 in the motor mechanism is operated by a cam 212 to energize coil 217 in relay 198 and open the starting circuit through switch 193, and to establish a holding circuit for this coil through contactor 197 and contact 220 of this relay until cam 192 has advanced to permit the contacts in switch 193 to open and break the holding circuit. Meanwhile, motor unit 187 has advanced cam shaft 203 to close the starting contacts 201 and has opened the interrupting contacts 213 to restore the sludge draw-off valve to normal, ready for another cycle of operation.

If, however, it is desired to provide an additional draw-off of sludge before cam 192 is rotated through its normal cycle of rotation, a manual control is provided in a single pole double throw switch 214 which may be moved momentarily to shunt the circuit of switch 193 and start motor 187, after which it will operate to open and close the sludge draw-off valve in a regular cycle and restore this valve mechanism and its circuit to a normal position ready for automatic operation. The manual switch 214 should be restored to its automatic position after the motor 187 has opened the slude draw-off valve.

If the sludge draw-off valve discharges too great an amount while operating in these controlled cycles, the volume of the discharge may be reduced by putting a reducer bushing in the discharge pipe 188 to act as an orifice and reduce the interval diameter of the discharge.

As the motor for the stirrer in the lime slurry tank is on a separate circuit with manual switch control, the switch should be closed at the beginning of a day's operations and opened at the close of the day's run.

From the foregoing, it is obvious how the automatic control for the parts of this system is controlled by the pulses created by the motor switch 153 and how the dosing is done during the time when raw water is being admitted to the reaction tank. For every unit of water, a predetermined amount of each of the dosing agents is provided. Also, by utilizing ejectors a more uniform operation is had without disturbances caused by clogging or choking of critical areas by deposits of the chemicals being handled.

I claim:

1. In a water treatment system, a reaction tank for removing objectionable ingredients from water by precipitation having discharge passage means for the withdrawal of treated water, a raw water supply pipe for supplying water to be treated to said reaction tank, an ejector in said raw water supply pipe, a meter for determining measured units of raw water entering said reaction tank, a dosing tank for a reagent solution for said reaction tank, a drop pipe in said dosing tank having connections with the suction of said ejector, a pulse switch operated by said meter for each predetermined unit of raw water being admitted to said reaction tank, a motor controlling the movement of said drop pipe, and a timing motor started by the pulse from said meter switch and operating for a predetermined adjustable interval, to effect energization of said first-mentioned motor for the lowering of said drop pipe.

2. In a water treatment system, a reaction tank for removing objectionable ingredients from water by precipitation having discharge passage means for the withdrawal of treated water, a branched raw water supply pipe for supplying water to be treated to said reaction tank, an ejector in each branch of said raw water supply pipe, dosing tanks for reagents for said reaction tank, drop pipes in said dosing tanks connected to the suctions of said ejectors, means operable by flowing water in said supply pipes for intermittently initiating downward movement of said drop pipes to receive predetermined amounts of reagent therein in discrete small droplets, said ejectors creating high velocity air currents through said drop pipes upon the flow of water through said ejectors and drawing said discrete droplets of dosing reagents through said drop pipes into the raw water entering said reaction tank.

3. In a water treatment system, a reaction tank for removing objectionable ingredients from water by precipitation having discharge passage means for the withdrawal of treated water, a raw water supply pipe communicating with said reaction tank, an ejector in said raw water supply pipe, a dosing tank for lime slurry for said reaction tank, a drop pipe in said dosing tank having connection to the suction of said ejector, a stilling ring suspended in said dosing tank pivotally supporting the free end of said drop pipe, said drop pipe terminating in a small diameter suction intake orifice, said suction intake orifice introducing discrete droplets of lime slurry from said dosing tank by a current of air at high velocity flowing therethrough to satisfy the demands of said ejector when raw water is in transit to said reaction tank as said drop pipe is slowly lowered in said dosing tank, means for initiating the lowering of said drop pipe successively responsive to the flow of water through said supply pipe, and control mechanism operative independent of the rate of flow of water through said supply pipe to selectively control the respective distances the drop pipe is lowered each time to thereby control the quantity of lime slurry admitted in discrete droplets into the drop pipe each time the drop pipe is lowered.

4. In a water treatment system, a reaction tank for removing objectionable ingredients from water by precipitation, a service pipe for withdrawing treated water from said reaction tank, a raw water supply pipe for supplying water to be treated to said reaction tank, a motor operated inlet valve in said raw water supply pipe, an ejector in said supply pipe between said inlet valve and said reaction tank, a dosing tank for reagent liquid for said reaction tank, a drop pipe in said dosing tank having connection to the suction of said ejector, a motor operated mechanism for lowering said drop pipe, a meter in said raw water supply pipe, a pulse switch operated by said meter for each unit of measured volume of raw water admitted to said reaction tank, and an electrical initiating and cycling system for said treatment system comprising a float operated switch to set up an initiating circuit to operate said motor operated inlet valve operation, a timing motor started by said meter operated pulse switch when water is flowing through said raw water pipe and control mechanism for lowering said drop pipe operated by said timing motor during its cycle of operation.

5. In a water treatment system, a reaction tank for removing objectionable ingredients from water by precipitation and having discharge passage means for the withdrawal of treated water, a service pipe for withdrawing treated water from said reaction tank, a branched raw water supply pipe for supplying water to be treated to said reaction tank, a motor operated inlet valve in said raw water supply pipe, ejectors in the branches of said raw water supply pipe between said inlet valve and where said raw water supply pipes empty into said reaction tank, a motor operated sludge draw-off valve for said reaction tank, dosing tanks for reagent liquids for said reaction tank, drop pipes in said dosing tanks having connections to the suctions of said ejectors, motor mechanisms for lowering said drop pipes, a meter in said raw water supply pipe, a pulse switch operated by said meter for each unit of measured volume of raw water admitted to said reaction tank and an electrical initiating and cycling system for said treatment system comprising a float operated switch operative to set up an initiating circuit to operate said motor operated inlet valve, a timing motor started by said meter operated pulse switch when water is flowing through said raw water supply pipe, control mechanism for lowering said drop pipes operated by said timing motor during its cycle of operation and a second timing motor integrating said impulses from said meter pulse switch to operate said sludge draw-off valve after a predetermined number of measured volumes of raw water have been admitted to said reaction tank.

6. In a water treatment system, a treatment tank having discharge passage means for the withdrawal of treated water, a raw water supply pipe communicating with said treatment tank, a meter in said raw water supply pipe, a pulse switch operated by said meter designating measured units of raw water admitted to said treatment tank, a motor controlled draw-off valve for said treatment tank, an electrically operated timing and cycling system controlled by impulses from said pulse switch, a timing motor operated by said timing and cycling system, an integrating cam operated by said timing motor advancing minutely for each impulse from said pulse switch, said integrator cam rotation depending upon the accumulation of a predetermined number of measured units of raw water entering said treatment tank and a relay operated by said integrating cam for energizing said motor controlled draw-off valve motor and for de-energizing said motor against a repeat operation until said integrating cam has undergone another rotation.

7. In a water treatment system, a tank having discharge passage means for the withdrawal of treated water, a raw water supply pipe to said tank, a meter in said raw water supply pipe, a pulse circuit closed by said meter for each measured quantity of raw water admitted to said tank, a timing motor started by said pulse circuit, an Archimedean cam driven by said timing motor, a contact switch operated by said cam causing a complete rotation of said cam at a predetermined rate of rotation even after said pulse circuit is broken, a second timing motor connected in parallel with said first timing motor to have the same duration of rotation, an integrating cam operated by said second timing motor at a slow rate of rotation demanding a predetermined number of separate measured quantities of raw water to said tank before said integrating cam completes a rotation, a relay operated by said integrator cam, a motor controlled draw-off valve for said tank operable to be started when contacts operated by said relay are closed, said motor operated draw-off valve completing an operation of opening and closing said draw-off valve when started, and said relay having contacts therein to disconnect said integrator cam to prevent a repeat operation until said integrator cam has completed a subsequent rotation.

8. In a water treatment system, a treatment tank having discharge passage means for the withdrawal of treated water, a motor operated valve for withdrawing sludge from the treatment tank, a pulse switch operated for each measured quantity of water entering said treatment tank, an integrating cam advanced a limited distance for each pulse switch operation, a control switch closed by said integrating cam when a predetermined number of measured units of water have been admitted to said treatment tank to operate said motor operated withdrawing valves, and a holding circuit operated by said motor controlled valve to prevent a repeat cycle of operation until said integrating cam is again rotated.

9. In a water treatment system, a reaction tank having discharge passage means for the withdrawal of treated water, a raw water supply pipe to said tank, a meter in said raw water supply pipe, a pulse switch operated by said motor for each determined number of measured volumes of raw water to said tank, a timing motor operating an Archimedean cam through a predetermined cycle of rotation, one contact operated by said cam to establish a maintaining circuit for said timing motor, a second contact operated by said cam operating a chemical feeder mechanism to said reaction tank, and a third contact operated by said cam operating a separate feeder mechanism for said reaction tank, each of said contacts operated by said Archimedean cam being adjustable therewith to provide for varying the quantity of liquid admitted to said reaction tank.

10. In a water treatment system, a reaction tank, a raw water supply pipe to said reaction tank, a service pipe for withdrawing treated water from said tank, dosing tanks for reagents for said reaction tank, motor controlled mechanisms for feeding said reagent solutions from said dosing tanks to said reaction tank, a low water level switch mechanism in said reaction tank to close an initiating circuit when low water prevails in said reaction tank, a motor controlled inlet valve in said raw water pipe operated by said initiating circuit, a meter in said raw water pipe, a pulse switch operated by said meter for each determined quantity of measured units of water passing to said reaction tank, a timing motor started in operation by said pulse switch, an Archimedean cam operated by said timing motor and having an established cycle of rotation, a contact operated by said cam establishing this cycle of rotation, a second contact adjustable with and operated by said cam to control one motor controlled dosing mechanism for said reaction tank, a third contact adjustable with and operated by said cam to control a second motor controlled dosing mechanism for said reaction tank, a second timing motor connected in parallel with said first timing motor whereby the motors operate simultaneously for a cycle determined by said Archimedean cam, an integrating cam operated by said second timing motor having a slow cycle of rotation based upon a number of pulse impulses determined by the number of measured units of raw water admitted to said reaction tank and a motor operated sludge draw-off valve operated by said integrating cam upon a complete rotation thereof.

11. In a fluid treatment apparatus, a treatment tank, means for introducing and withdrawing fluid from said tank, a motor operated valve controlling flow of fluid from the treatment tank, means for measuring the quantity of fluid passing through said tank, a pulse switch operated by said measuring means for each measured quantity of fluid passing through said tank, an integrating cam advanced a limited distance for each pulse switch operation, a control switch operated by said cam and adapted to be closed thereby when a predetermined number of measured units of fluid have passed through the tank to operate said motor operated valve, and a holding circuit to prevent a repeat cycle of operation until said integrating cam is again rotated.

12. In a water treatment system, a reaction tank for removing objectionable ingredients by precipitation, a service pipe for withdrawing treated water from said reaction tank, a raw water supply pipe for supplying water to be treated to said reaction tank, a tank for dosing reagent, a drop pipe in said tank having an inlet opening in one end thereof, an ejector in said raw water supply pipe having a suction inlet, a reagent inlet pipe connecting said drop pipe to said suction inlet and providing a closed hydraulic circuit therebetween, said ejector being operative in response to the flow of water through said supply pipe to draw air in through said inlet opening in said drop pipe and through said reagent inlet pipe at a high rate of flow and to inject the air into the water flowing through said supply pipe, and means for supporting said one end of the drop pipe and for lowering said one end of the drop pipe in said dosing tank at a slow rate such that the reagent flows from the dosing tank into said inlet opening at a rate of flow which is low as compared to the rate of flow of air through said inlet opening whereby the reagent passes in small discrete quantities through said drop pipe and reagent inlet pipe to the ejector.

13. In a water treatment system, a reaction tank for removing objectionable ingredients by precipitation and having a mixing compartment, a service pipe for withdrawing treated water from said reaction tank, an ejector including a throat having an outlet at one end, a reagent inlet nozzle disposed axially of said throat adjacent the other end and a water inlet cavity surrounding said nozzle, a lime slurry dosing tank, a drop pipe in said dosing tank having an inlet opening in one end thereof, a reagent inlet pipe connecting said drop pipe to said nozzle and providing a closed hydraulic circuit therebetween, means connecting said supply line to said cavity surrounding said nozzle to draw air at a high rate of flow in through said inlet opening in the drop pipe and through the drop pipe and reagent inlet pipe in response to the flow of water from said supply pipe through said ejector, means for supporting said one end of the drop pipe in said dosing tank and for lowering said one end of the drop pipe at a slow rate in said dosing tank such that the lime slurry flows from the dosing tank into said inlet at a rate of flow which is low as compared to the rate of flow of air through said inlet opening whereby the reagent passes in small discrete quantities through said drop pipe and reagent inlet pipe to the ejector, and a conduit extending from said outlet of the ejector to a point adjacent the bottom of said mixing compartment to pass the raw water having air and lime slurry mixed therewith into the bottom of the mixing compartment.

14. In a water treatment system, a reaction tank for removing objectionable ingredients by precipitation, a service pipe for withdrawing treated water from said reaction tank, a raw water supply pipe for supplying water to be treated to said reaction tank, a tank for dosing reagent, a drop pipe in said tank having an inlet opening in one end thereof, an ejector in said raw water supply pipe having a suction inlet, a reagent inlet pipe connecting said drop pipe to said suction inlet and providing a closed hydraulic circuit therebetween, said ejector being operative in response to the flow of water through said supply pipe to draw air in through said inlet opening in said drop pipe and through said reagent inlet pipe at a high rate of flow and to inject the air into the water flowing through said supply pipe, means for supporting said one end of the drop pipe in said dosing tank with said inlet opening in the drop pipe opening upwardly, and means including said supporting means for lowering said one end of the drop pipe in said dosing tank at a slow rate such that the reagent flows from the dosing tank into said inlet opening in the drop pipe at a rate of flow which is low as compared to the rate of flow of air through said inlet whereby the reagent is carried by the air stream in small discrete quantities through said drop pipe and reagent inlet pipe.

15. In a water treatment system, a reaction tank for removing objectionable ingredients by precipitation and having a mixing compartment, a service pipe for withdrawing treated water from said reaction tank, an ejector including a throat having an outlet at one end, a reagent inlet nozzle disposed axially of said throat adjacent the other end and a water inlet cavity surrounding said nozzle, a lime slurry dosing tank, a drop pipe in said dosing tank having an inlet opening in one end thereof, a reagent inlet pipe connecting said drop pipe to said nozzle and providing a closed hydraulic circuit therebetween, means connecting said supply line to said cavity surrounding said nozzle to draw air at a high rate of flow in through said inlet opening in the drop pipe and through the drop pipe and reagent inlet pipe in response to the flow of water from said supply pipe through said ejector, means for supporting said one end of the drop pipe in said dosing tank and for lowering said one end of the drop pipe at a slow rate in said dosing tank such that the lime slurry flows from the dosing tank into said inlet at a rate of flow which is low as compared to the rate of flow of air through said inlet opening whereby the reagent passes in small discrete quantities through said drop pipe and reagent inlet pipe to the ejector, said ejector being located at the top of said treatment tank, and a straight conduit extending downwardly from the said outlet of the injector into said mixing compartment and terminating adjacent the bottom thereof for passing the mixture of the raw water, lime slurry and air into the bottom of the treatment tank.

References Cited in the file of this patent

UNITED STATES PATENTS

| | | |
|---|---|---|
| 830,552 | Zeigler | Sept. 11, 1906 |
| 890,047 | Greth | June 9, 1908 |
| 1,123,011 | Ripley | Dec. 29, 1914 |
| 1,546,374 | Friend | July 21, 1925 |
| 1,900,143 | Wallace | Mar. 7, 1933 |
| 1,914,333 | Staegeman | June 13, 1933 |
| 1,934,791 | Butzler | Nov. 14, 1933 |
| 2,126,164 | Anderson | Aug. 9, 1938 |
| 2,240,182 | Guldner et al. | Apr. 29, 1941 |
| 2,317,847 | Duden | Apr. 27, 1943 |
| 2,355,561 | Robinson | Aug. 8, 1944 |
| 2,365,298 | Sebald et al. | Dec. 19, 1944 |
| 2,422,258 | Praeger | June 17, 1947 |
| 2,446,655 | Lawrason | Aug. 10, 1948 |
| 2,483,672 | Robinson | Oct. 3, 1949 |
| 2,502,349 | Sebald | Mar. 28, 1950 |
| 2,594,476 | Miller | Apr. 29, 1952 |
| 2,604,445 | Lansing | July 22, 1952 |
| 2,636,609 | Blanchet | Apr. 28, 1953 |

FOREIGN PATENTS

| | | |
|---|---|---|
| 7,545 | Great Britain | 1895 |